(No Model.)
C. E. SCRIBNER.
TESTING APPARATUS FOR TRUNK LINES OF TELEPHONE EXCHANGES.
No. 473,089. Patented Apr. 19, 1892.
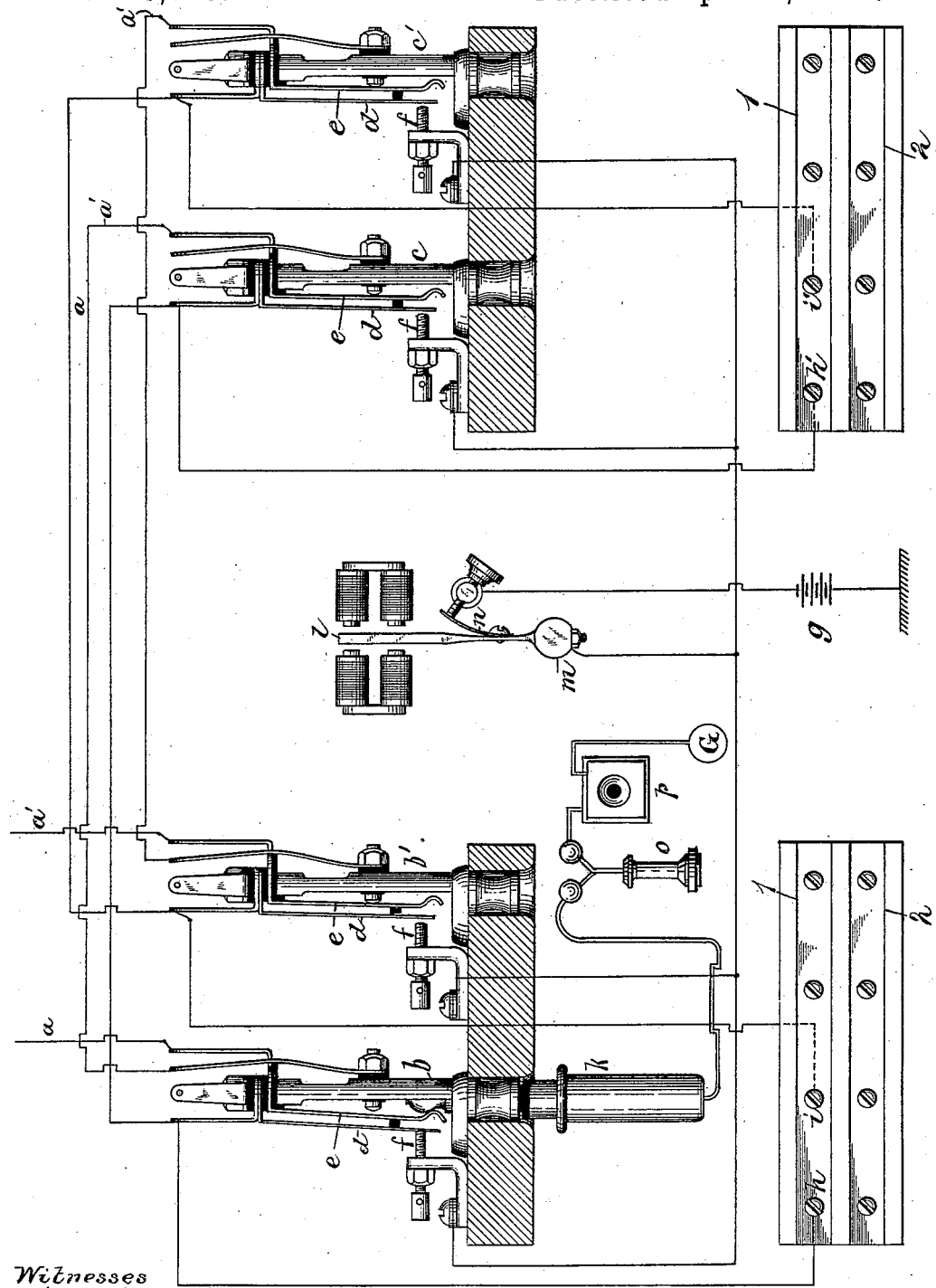
Witnesses
Inventor
Charles E. Scribner
By George H. Barton
Attorney

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

TESTING APPARATUS FOR TRUNK-LINES OF TELEPHONE-EXCHANGES.

SPECIFICATION forming part of Letters Patent No. 473,089, dated April 19, 1892.

Application filed March 13, 1885. Serial No. 158,761. (No model.)

*To all whom it may concern:*

Be it known that I, CHARLES E. SCRIBNER, a citizen of the United States, residing at Chicago, in the county of Cook and State of Illinois, have invented a certain new and useful Improvement in Testing Apparatus for Trunk-Lines of Telephone-Exchanges, (Case No. 78,) of which the following is a full, clear, concise, and exact description, reference being had to the accompanying drawing, forming a part of this specification.

It is common in telephone-exchange systems where the number of subscribers is large to arrange their lines in groups or sub-exchanges and connect these sub-exchanges by means of trunk-lines. When multiple switchboards are used, each board must be provided with trunk-line switches in addition to the switches of the telephone-lines, so that any two trunk-lines, as well as any telephone-line and trunk-line, may be connected together upon either of the multiple boards. When several trunk-lines, say twenty, are used between the central station and a sub-exchange or between two sub-exchanges, it is evident that the operators must make tests to find a trunk-line that is free before making a connection therewith, and by the system now in use one must be tested after another at random until one is found that is not in use. Much valuable time is thus lost to the exchange and to the subscriber who is waiting for the connection.

My invention is designed to enable the operator wishing to connect with a trunk-line to make a quick test to determine what trunk-lines are free.

My invention consists in providing a branch local circuit for each of the trunk-lines, each local circuit thus formed being branched to a terminal or stud at or upon each of the boards. Contact-points and switching apparatus are also provided, whereby the local circuit of a given trunk-line may be closed to battery automatically when a plug is inserted in a trunk-line spring-jack, so that the terminals or studs belonging to a given trunk-line will be connected to battery, a buzzer being included in the circuit with the battery.

A test may be made by connecting the terminals with suitable testing apparatus to determine whether a given terminal is connected to battery, and hence whether the trunk-line to which a given terminal belongs is free. When the battery is thus connected with the test-points, the reed or buzzer constantly interrupts the circuit, and when a test is made the sound or tone of the buzzer will be heard immediately upon touching the stud or test point of a busy line.

In the drawing I have shown two trunk-lines connected with spring-jacks on two multiple boards and the local circuit for testing, the terminals of the local circuits being arranged in grooves at each of the boards.

$a$ and $a'$ are the trunk-lines connected, respectively, to their switches $b\ b'$ and $c\ c'$ on the different boards. These switches are specially adapted to my testing system, the auxiliary spring $d$ being operated by the movement of the spring $e$ of the spring-jack to close against contact-point $f$, as shown at switch $b$, when the plug is inserted. The battery $g$ is branched, as shown, to the different contact-points $f$. The springs $d$ are each branched to studs $h\ h'$ and $i\ i'$ at the different boards, as shown. When, therefore, a plug $k$ is inserted, as shown, at switch $b$, contact is made between spring $d$ and contact-point $f$, thus connecting the battery $g$ with studs $h\ h'$, one stud or terminal being at each of the multiple boards. When the battery is thus connected with terminals $h\ h'$, it is evident that if connection is made with either of them—as, for example, by a plug forming the terminal of a ground-circuit, in which is included a signal-instrument—current will be sent through the signal-instrument, and the operator, listening at or observing the signal-instrument, will know that the line is in use. I preferably include a vibrating contact-maker in the circuit with the battery, which is operated continuously by means of electro-magnets in any well-known way. The terminals representing the trunk-lines, extending to any given sub-exchange, I preferably arrange in a groove by themselves, so that each of the several grooves will contain the signal-terminals of trunk-lines of but one sub-office or sub-exchange. Thus the groove 1 at each board may contain the signal-terminals of trunk-lines $a\ a'$ leading to exchange No. 1. The groove 2 at each board may contain only the test-terminals of some other set of trunk-lines—as, for example, those leading to a sub-station No. 2. I have shown only two of the terminals in each of the grooves 1 connected with the branch circuits. It is evident that the other terminals in the grooves can in like manner be connected with the local circuits of other trunk-lines. The reed $l$ is mounted on stud $m$. The spring $n$ vibrates with the reed and continuously makes and breaks the circuit, giving a particular tone. It will thus be seen that when any trunk-line is in use its local circuit, and consequently its test-terminals, will be connected with the circuit of the test-battery. The operator by applying any suitable test to the test-terminal of the line at his board may therefore readily determine whether the line is in use. The test which I preferably use consists of a plug at the end of a normally-open circuit, which includes a telephone. The operator by touching the plug to any given terminal may readily ascertain whether the terminal is connected with battery, and hence whether a particular trunk-line is in use. By arranging the terminals in grooves and running the point of the plug along the groove containing the terminals belonging to a given sub-station a free line may be found very readily, for as the operator listens he will hear the tone of the reed as the point of the plug comes successively in contact with the test-terminals or studs of the trunk-lines that are busy. When the plug touches a test-terminal which does not respond, he will know that the line corresponding thereto is free and will at once make a connection therewith. I have shown the operator's telephone and transmitter $o\ p$ in a ground-circuit with the plug $k$.

Any well-known operator's outfit may be used for receiving and answering the calls and any well-known switching apparatus for making the connection and disconnections between the lines. I have sometimes made the grooves containing the test-terminals upon the different switchboards immediately below the spring-jacks of the trunk-lines, so that a test-terminal will be found immediately below each of the said spring-jacks corresponding to the line of the spring-jack below which it is placed. The ordinary connecting-plug being connected with the operator's telephone while the test is being made, it is evident that as soon as a free line is found the operator can immediately insert the plug in the switch above the terminal that tests free. After ringing up the operator at the other end of the trunk-line with which he has made connection he disconnects his telephone by means of the ordinary switching apparatus and proceeds to attend to the next call. It will thus be seen that a plug inserted in any trunk-line spring-jack, in addition to making the ordinary connection between the plug-point and the line, serves to close a local circuit connecting a battery with test-terminals, one on each board, corresponding to the one that is in use.

Having thus described my invention, I claim as new and desire to secure by Letters Patent—

1. The combination, with two or more multiple switchboards, of trunk-lines and their spring-jacks, local circuits, one for each trunk-line, a circuit-closer operated by the movement of the springs of the different spring-jacks to close the local circuit of any given line when a connection is made therewith, a reed or vibrator included in the battery-wire common to all of said local circuits, test-terminals or studs connected with the local circuits, one with each local circuit at each board, said test-terminals being placed near one another in line, and testing apparatus at each board to determine whether any given test-terminal is connected with the battery and reed or vibrator.

2. The combination, with two or more trunk-lines extending from one telephone-exchange to another exchange, of multiple switchboards at one of said exchanges, each multiple switchboard being provided with spring-jacks, one spring-jack for each trunk-line, local circuits, one for each line, each local circuit including a stud or test-terminal at each of the multiple boards, said test-terminals at a given board for the trunk-lines which extend to a given exchange being arranged together and in close proximity to each other, a circuit-closer in each local circuit operated by the spring-jacks of the trunk-line of said spring-jacks when a plug is inserted therein, and testing apparatus at each board whereby a quick test may be made to determine which of the trunk-lines are busy.

3. In a telephone-exchange, the combination, with two or more trunk-lines, of multiple switchboards provided with spring-jacks, one spring-jack on each board for each line, local circuits, one for each trunk-line, and terminals in each local circuit, one at each board, the terminals at each board being near each other and in a line in a groove, and a plug connected with a circuit including a telephone, whereby a quick test may be made to determine which of the trunk-lines are in use.

In witness whereof I hereunto subscribe my name this 3d day of February, A. D. 1885.

CHARLES E. SCRIBNER.

Witnesses:
GEORGE P. BARTON,
F. H. McCULLOCH.